(12) United States Patent
Ramfjord (10) Patent No.: US 9,126,276 B2
(45) Date of Patent: Sep. 8, 2015

(54) APPARATUS AND METHOD FOR CUTTING TUBULAR PARTS SUBSEA

(75) Inventor: Harald Ramfjord, Gjovik (NO)

(73) Assignee: 1 Diamond, LLC, TX (US)

( * ) Notice: Subject to any disclaimer, the term of this patent is extended or adjusted under 35 U.S.C. 154(b) by 603 days.

(21) Appl. No.: 12/990,446

(22) PCT Filed: Apr. 28, 2009

(86) PCT No.: PCT/NO2009/000162
§ 371 (c)(1),
(2), (4) Date: Dec. 21, 2010

(87) PCT Pub. No.: WO2009/134140
PCT Pub. Date: Nov. 5, 2009

(65) Prior Publication Data
US 2011/0100638 A1    May 5, 2011

(30) Foreign Application Priority Data

Apr. 30, 2008    (NO) .................................. 20082061

(51) Int. Cl.
E21B 7/12 (2006.01)
B23D 57/00 (2006.01)
B23D 21/04 (2006.01)
(Continued)

(52) U.S. Cl.
CPC ............ B23D 57/0084 (2013.01); B23D 21/04 (2013.01); B23D 45/126 (2013.01); B26D 3/16 (2013.01); B26D 7/02 (2013.01)

(58) Field of Classification Search
USPC ......... 166/352, 361, 297, 298, 55, 55.1, 55.6; 405/156; 175/5, 6, 208; 83/54; 30/92, 30/93, 94
See application file for complete search history.

(56) References Cited

U.S. PATENT DOCUMENTS 1,902,616 A    3/1933  Brungardt et al.
2,679,686 A *  6/1954  Ingwer et al. .................... 30/97
(Continued)

FOREIGN PATENT DOCUMENTS

GB    2430399 A    3/2007
GB    2448919 A    11/2008
JP    57211410 A    12/1982

OTHER PUBLICATIONS

PCT/NO2009/000162 International Search Report, Jul. 16, 2009 (5 p.).
(Continued)

Primary Examiner — Matthew Buck
Assistant Examiner — Aaron Lembo
(74) Attorney, Agent, or Firm — Conley Rose, P.C.

(57) ABSTRACT

The present invention concerns an apparatus for cutting a tubular part (16) extending down into a sea- or ocean bed. The apparatus includes a carrying body (1) adapted to be led over the tubular part (16) that is to be cut, with a cutting assembly placed in the carrying body (1). The cutting assembly includes a ring adapted to be driven in rotation in the carrying body (1). At least one cutting element (6) with a cutting portion (19), is hinged to the ring. At least one actuator (3) is adapted for leading the cutting element (6) between a retracted position and a cutting position against the tubular part (16) that is to be cut. Furthermore it is described an assembly with a cutting apparatus (A) and a carrying body (1) with a least one jaw (15, 28, 29) for fixing and centring the tubular part (16) in relation to the apparatus (A), and a method for subsea cutting of tubular parts (16).

16 Claims, 8 Drawing Sheets (51) Int. Cl.
  *B23D 45/12* (2006.01)
  *B26D 3/16* (2006.01)
  *B26D 7/02* (2006.01)

(56) References Cited

U.S. PATENT DOCUMENTS

| | | | |
|---|---|---|---|
| 2,842,238 A * | 7/1958 | Shaw et al. | 409/179 |
| 3,249,998 A * | 5/1966 | Shultz | 30/101 |
| 3,293,963 A | 12/1966 | Carroll et al. | |
| 3,456,856 A * | 7/1969 | Tringale et al. | 225/103 |
| 3,650,514 A * | 3/1972 | Stunkard | 266/56 |
| 3,711,938 A * | 1/1973 | Warren et al. | 228/213 |
| 3,720,260 A * | 3/1973 | Duck et al. | 166/336 |
| 3,807,047 A * | 4/1974 | Sherer et al. | 30/97 |
| 3,840,170 A * | 10/1974 | Arikawa et al. | 228/29 |
| 3,942,248 A * | 3/1976 | Sherer et al. | 30/97 |
| 4,091,514 A | 5/1978 | Motes-Conners et al. | |
| 4,185,525 A * | 1/1980 | Sherer | 82/113 |
| 4,206,664 A * | 6/1980 | Miyagawa | 82/113 |
| 4,492,136 A * | 1/1985 | Walker | 83/169 |
| 4,900,198 A * | 2/1990 | Hoaki | 405/303 |
| 4,953,292 A * | 9/1990 | Tobey | 30/97 |
| 4,987,808 A * | 1/1991 | Sicka et al. | 83/13 |
| 5,394,776 A | 3/1995 | Robinson | |
| 5,458,439 A | 10/1995 | Hall et al. | |
| 5,557,995 A * | 9/1996 | Robinson | 82/113 |
| 6,267,037 B1 * | 7/2001 | McCoy et al. | 83/745 |
| 6,502,488 B1 * | 1/2003 | Taylor | 82/130 |
| 6,827,145 B2 * | 12/2004 | Fotland et al. | 166/298 |
| 7,406,905 B2 * | 8/2008 | Lawler et al. | 83/651.1 |
| 8,082,823 B2 * | 12/2011 | Kravitch | 82/1.11 |
| 8,291,977 B2 * | 10/2012 | Mire | 166/298 |

OTHER PUBLICATIONS

Office Action for Norwegian Application No. 20082061, Nov. 20, 2008 (3 p.).

* cited by examiner

APPARATUS AND METHOD FOR CUTTING TUBULAR PARTS SUBSEA

CROSS-REFERENCE TO RELATED APPLICATIONS

This application is a 35 U.S.C. §371 national stage application of PCT/NO2009/000162 filed Apr. 28, 2009, which claims the benefit of Norwegian Patent Application No. 20082061 filed Apr. 30, 2008, both of which are incorporated herein by reference in their entireties for all purposes.

STATEMENT REGARDING FEDERALLY-SPONSORED RESEARCH OR DEVELOPMENT

No applicable.

SUMMARY

The present invention concerns an apparatus for cutting tubular parts extending into a sea- or ocean bed and a method for cutting tubular parts subsea.

The apparatus includes a carrying body adapted to be led over the tubular part that is to be cut, and includes a cutting assembly placed in the carrying body. The cutting assembly includes at least one cutting element with a cutting portion placed on a ring or rim adapted to be driven in rotation in the carrying body. Furthermore a method for cutting such elements is described.

When cutting tubular parts subsea, it is a problem that these parts are difficult to reach, and divers have traditionally been used to handle equipment for cutting these parts. It is a requirement that equipment placed on the seabed, typically casings and well heads that extend up from the surface of the ocean, must be removed when they no longer are in use, due to concerns related to the environment and the fishing industry. When equipment that is placed on the seabed is to be removed, tubulars that extend up from the seabed must in many cases be cut, preferably below the seabed. Such cutting is considered as extremely hazardous and one has traditionally had to dredge a ditch around the tubular that is to be removed. Divers have then handled equipment around the tubular in the dredged area. This is considered as a very hazardous operation as the seabed in many cases is so unconsolidated that the ditch that is dredged easily may collapse when the divers perform the cutting of the tubular. The tubular shall typically be cut 5 meter (15 feet) below the seabed. This and other problems may be solved with an apparatus as defined in the present claims.

Accordingly the present invention concerns an apparatus for cutting tubular parts that extend down into a sea- or ocean bed. The apparatus can cut tubulars without using divers or submarine vessels, and therefore enables a considerable economic saving, at the same time as tasks that are very hazardous for personnel are avoided. The apparatus includes a carrying body adapted to be led over the tubular part that is to be cut. The carrying body accommodates a cutting assembly. The cutting assembly includes a ring adapted to driven in rotation in the carrying body and at least one cutting element with a cutting portion, hinged to the ring. The cutting assembly includes at least one actuator for leading the cutting element between a retracted position and a cutting position towards the tubular part that is to be cut.

The carrying body may include jetting nozzles for jetting down the carrying body with the carrying assembly down in the seabed for cutting off the tubular part 5 on a level below the seabed.

The cutting assembly may include at least two cutting elements with respective actuators placed on the ring, at a distance of 180° degrees from each other. The cutting assembly may further include at least four cutting elements with the respective actuators placed on the ring, at the distance of 90° degrees from each other.

It may be advantageous to include more assemblies that what is considered necessary to have redundant assemblies that to ensure that the cut is made.

The cutting assembly may include a toothed ring or rim that runs in a bearing ring, as at least one motor, preferably placed on the carrying body, includes a gear or pinion meshing with the toothed ring or driving the ring in relation to the carrying body. It may be used several motors, both to distribute the loads to be able to increase the force, and to maintain operation even if one motor should fail.

The cutting assembly can be placed in an internal housing in the carrying body for protection. The housing may include an opening for the tubular part through the housing and a gap for the at least one cutting element, such that the at least one cutting element may adopt a first position inside the housing and a second position extending through the gap. I may however be an advantage with symmetrically placed cutting assemblies to provide a balanced load on the cutting assembly.

The gap may further include a flexible protective structure to protect the cutting assembly against foreign bodies and debris. The actuator or actuators may be a hydraulic cylinder and the measuring means may be placed in the cutting assembly for monitoring the position of the cutting element. The actuators may however also be of a different type, known within the field for instance electric units with driven threads, toothed rack etc.

The cutting portion of the cutting element may include synthetic diamonds.

The cutting element may include rolling elements on a face towards a cutting face of the item to be cut, to prevent jamming of the cutting element in the tubular element that is to be cut.

The carrying body may include a unit for holding and centring the tubular part that is to be cut.

Furthermore the invention concerns an assembly with a cutting apparatus and a carrying body as described above. The assembly may furthermore include at least one jaw or wedge for holding and centring the tubular part in relation to the cutting apparatus.

The actuator may be connected to the carrying body and the at least one jaw to press the jaw to towards the tubular part. It may also be used common wedges in slips to hold the tubular part in the apparatus.

The assembly may further include at least one set of jaws at each side of the cutting apparatus. At least one of the sets of jaws may be secured with a movable jaw attachment allowing a lifting jaw to be moved somewhat with an axial component for imposing a tensile stress in the tubular part.

The assembly may include at least two jaws, where each jaw is connected to an actuator and where each actuator can be individually controlled based on signals from measuring means that measures the location of the tubular part in relation to the carrying body.

Furthermore the invention concerns a method for subsea cutting of tubular parts. The method includes lowering a carrying body with a cutting assembly from a vessel and down over the tubular part that is to be cut, such that the cutting assembly is located where the cut is to be performed. The tubular part can then be centred in relation to the cutting assembly with a centring assembly. A ring with cutting elements on the cutting assembly is put in rotation by at least one motor. The cutting elements are then led towards the tubular part with actuators such that a force is applied on the cutting elements towards the tubular part, such that the tubular part is cut. Finally, the carrying body with the cutting element and the cut off tubular part may be retrieved to the vessel.

The method may furthermore include jetting the carrying body with the cutting assembly down to a level below the level of the seabed by jetting nozzles on the carrying body.

DETAILED DESCRIPTION OF THE DISCLOSED EMBODIMENTS

Figure 1:
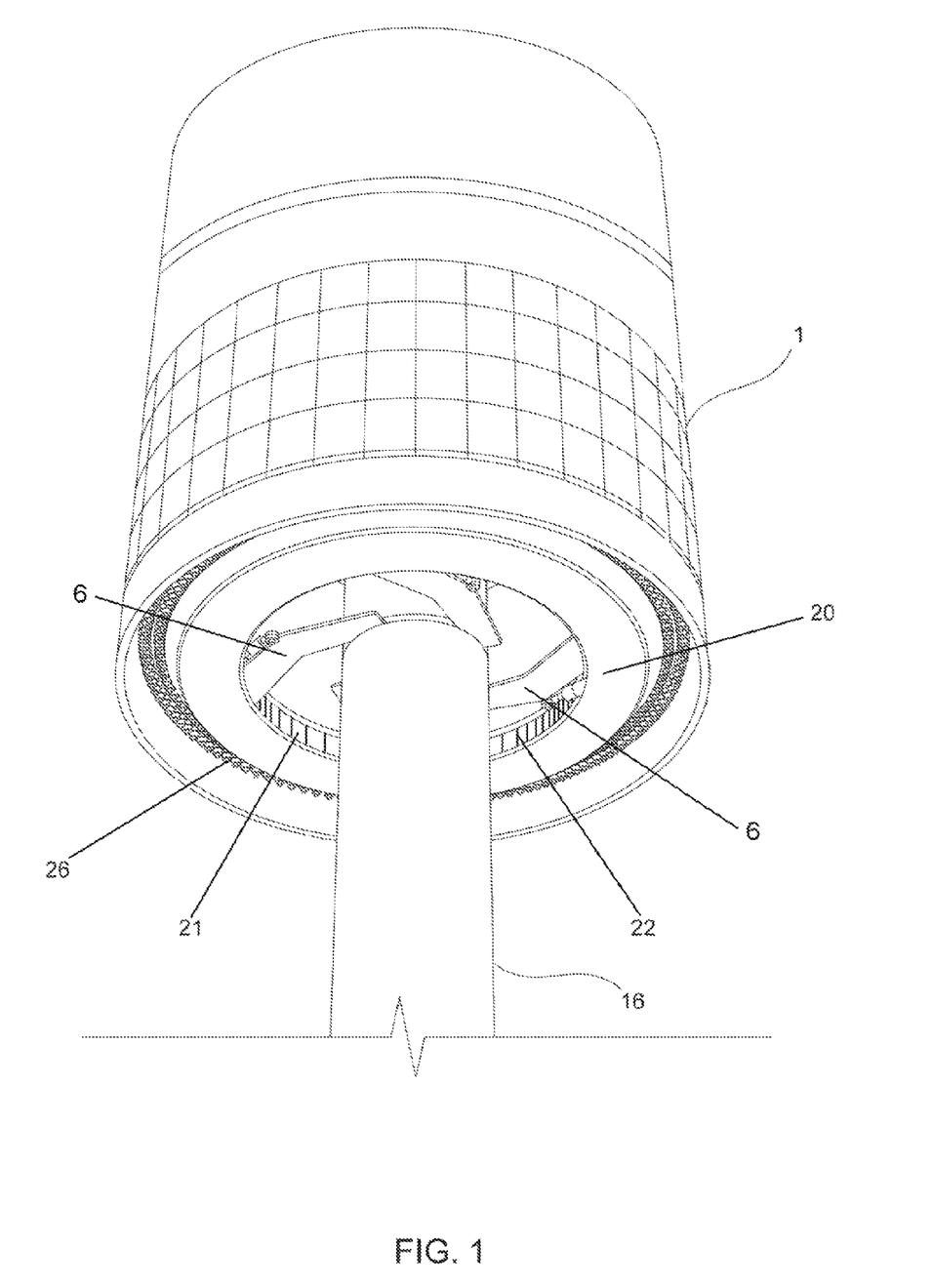
FIG. 1 shows an apparatus according to the invention, placed in a carrying body.

In FIG. 1 it is shown a perspective view of a carrying body 1 carrying the cutting apparatus according to the invention. The carrying body and the cutting apparatus according to the invention are led over a tubular part 16. The cutting apparatus include cutting elements 6. The cutting elements 6 form a part of a cutting assembly (not shown) placed in an internal housing 20 in the carrying body 1. The internal housing 20 include a gap or openings 21 for the cutting elements 6 to extend through when these are in operation for cutting the tubular part 16. The gap or opening 21 may be covered by a flexible protective structure 22 to protect the cutting assembly against ingress of mud and foreign bodies to ensure reliable operation of the cutting assembly. The flexible protective structure 22 may typically include an elastic rubber structure, brush like elements, or any other elements that are able to protect the cutting assembly at the same time as the cutting elements 6 are allowed to pass. The flexible protective structure 22 may be fixed in relation to the housing or carrying body 1, or may rotate with the cutting elements 6. The carrying body may also include jetting nozzles 26 at its lower end, and alternatively also on the side to remove the mass around the tubular part 16 that is to be cut.

Figure 2:
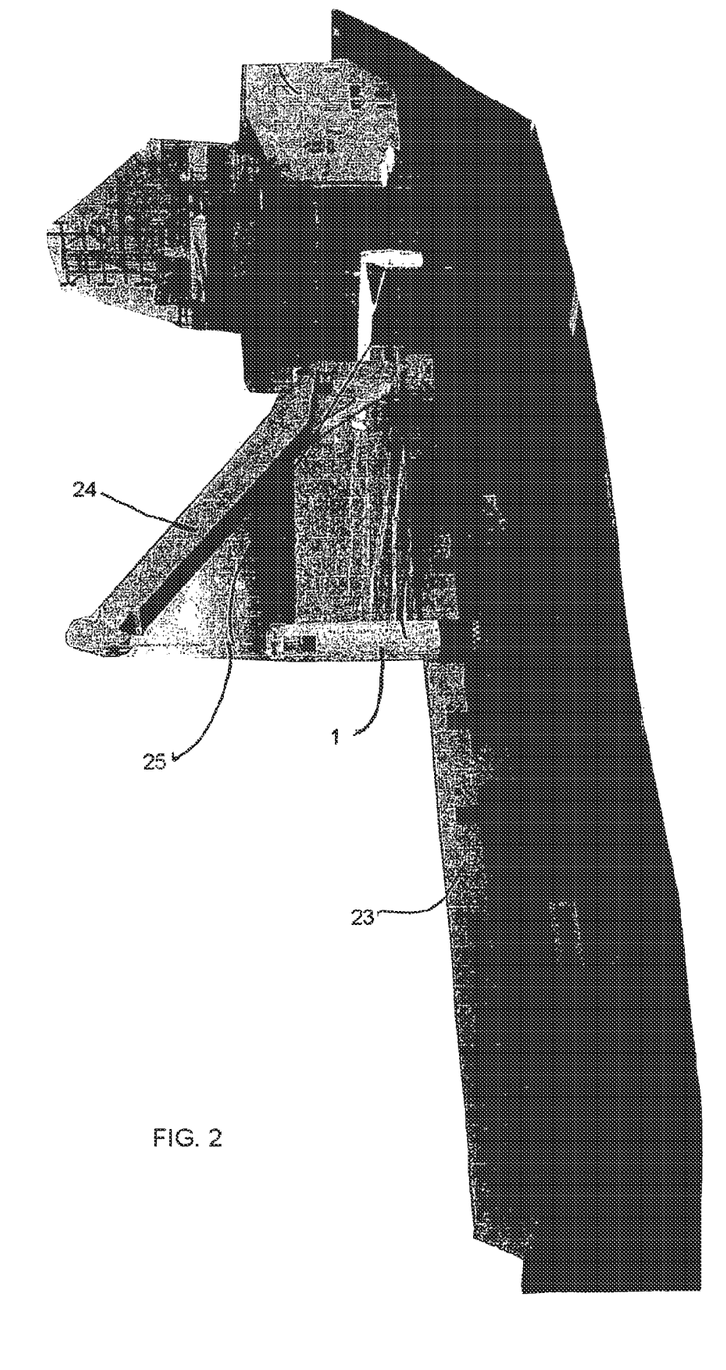
FIG. 2 shows a vessel for launching a carrying body with an apparatus 5 according to the invention.

In FIG. 2 it is shown a vessel 23 with a crane 24. A carrying body 1 with a cutting assembly according to the invention, is suspended in a wire 25 in the crane 24. An umbilical for supply of energy, and for connection to measuring- and control equipment may extend along the wire 25, or may be connected to the carrying body 1 in any other way. The umbilical may also include hoses for leading high pressure water for jetting down the carrying body 1 into the bottom around the tubular part that is to be removed.

Figure 3:
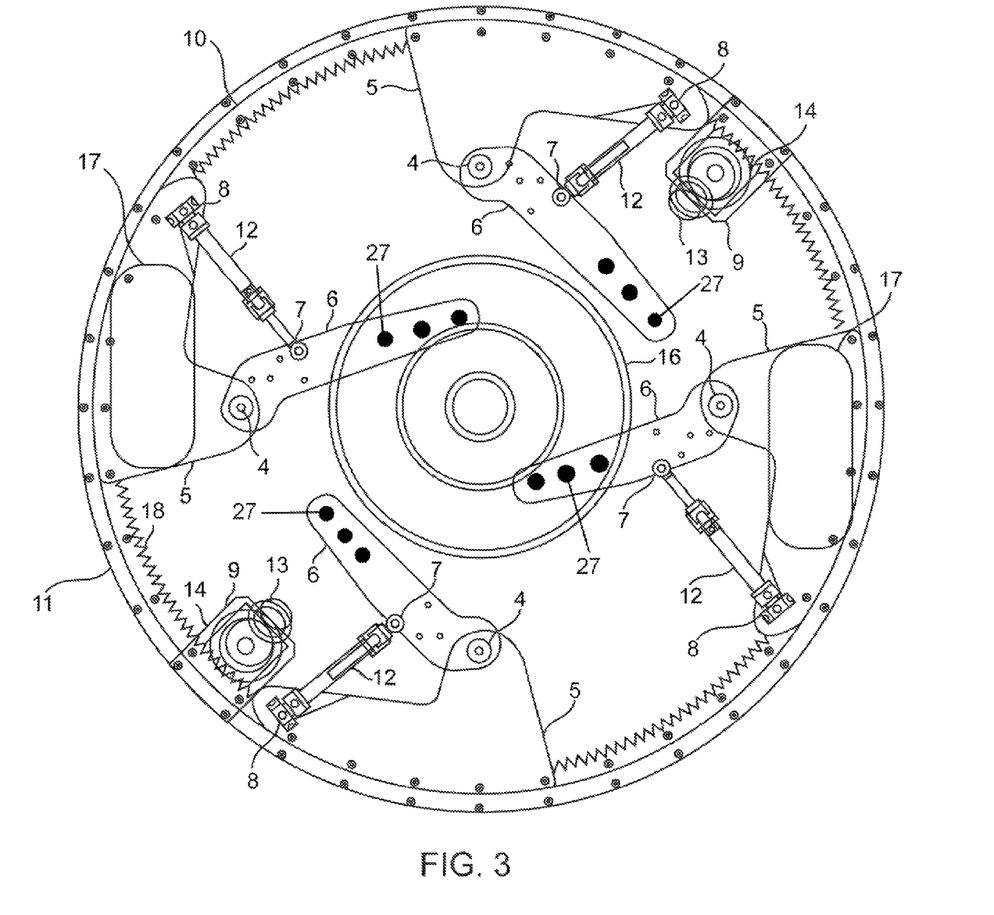
FIG. 3 shows an apparatus according to the invention from below.

In FIG. 3 the apparatus according to the invention is shown from below, in addition to a cross section of a tubular part 16 that is been cut. The tubular part 16 is shown as a cemented casing, to be cut. As shown in the figure, the tubular part 16 includes a combination of a steel tubing and a concrete, and these are the tubing types that normally are demanding to cut.

In the embodiment of FIG. 3 it is shown four cutting elements 6 that are pivoted or hinged to the cutting assembly in joints 4. The cutting elements 6 may be led between a retracted position (two of the elements are shown in the retracted position) and an extended position (two of the elements 6 are shown in the extended position) by actuators 12. The actuators 12 are typically hydraulic cylinders that are pivotally attached in carrier bodies 5. The carrier bodies 5 attaches the hydraulic cylinders 12 to a toothed ring or rim 18 that is supported in a ring 11 through a bearing face 10. The toothed ring 11 is driven by two hydraulic motors 13 attached in brackets 9 that are fixed in relation to the ring 11. Gears 14 are attached to shafts on the motors 13 and are meshing with the rotating toothed ring 18. The hydraulic motors 13 may in this way turn the toothed ring 18, the carrier bodies 5 and thereby also the cutting elements 6 and the hydraulic cylinders 12. The cutting elements 6 include a cutting portion 19 that typically is a cutting edge where synthetic diamonds are attached. The cutting elements 6 that are shown out of contact with the tubular part 16 may act as redundant or spare elements in case the cutting element 6 that are in contact with the tubular part 16 fails or wears out. The ring 11 will be fixed in the carrying body 1 along with the motors 14 by the motor brackets 9. In operation will thereby the motors 13 turn the gears 14 and drive the toothed ring 18 with the carrier bodies 5 and thereby the pivotally attached cutting elements 6. Measuring means 17 for each cutting element 6 measures the position of the cutting elements and the force that is applied to the cutting elements. The measuring means 17 may also include various sensors for measuring other desired parameters such that the cutting can be controlled and monitored.

The hydraulic cylinders 12 may be attached with a connection allowing rotation of the cutting assembly.

To ease transfer of energy, may the rotating part of the assembly include a separate hydraulic system with a dedicated electrically driven hydraulic pump.

Figure 4:
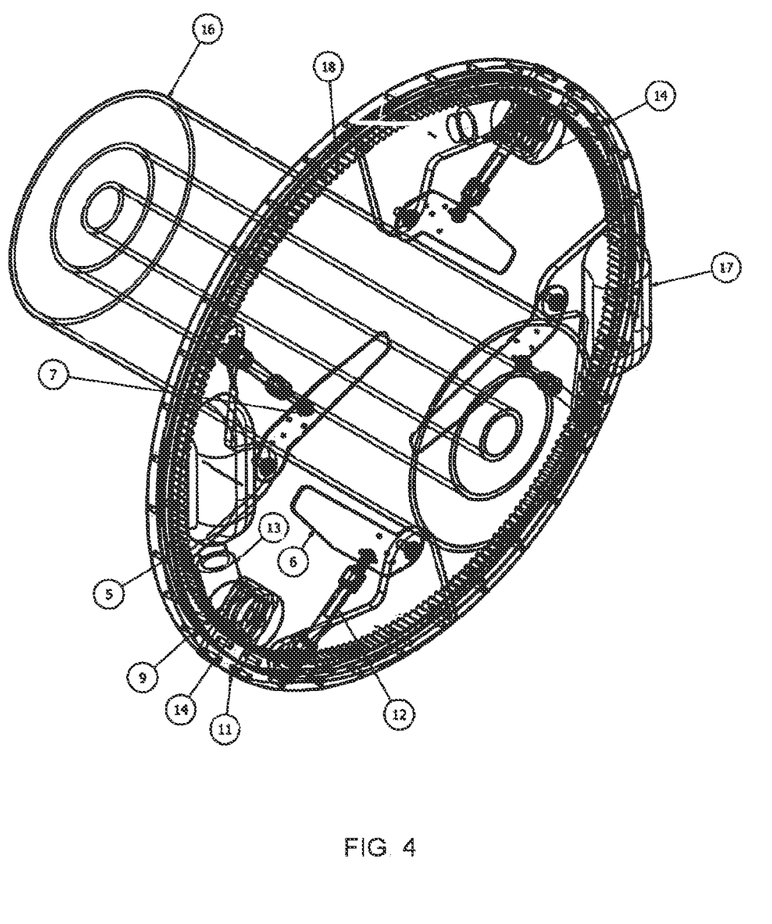
FIG. 4 shows an apparatus according to the invention, in perspective view.

FIG. 4 shows the embodiment shown in FIG. 3 in a perspective view, placed around a tubular part 16 that is to be cut. Furthermore the measuring means 17, the gears 14, the motor bracket 9 with the motor 13 are shown. The gears 14 meshes with the toothed ring 18. Two cutting elements 6 are shown in a cutting position inside the tubular part 16, and two cutting elements 6 are shown in a retracted position out of contact with the tubular part 16.

The hydraulic cylinders 12 are shown attached in a joint 8 in the carrier body 5, and through a joint 7 in the cutting element 6. The toothed ring 18 is shown supported in the ring 11. The motor 13 is fixed in relation to the ring 11 by motor bracket 9.

Figure 5:
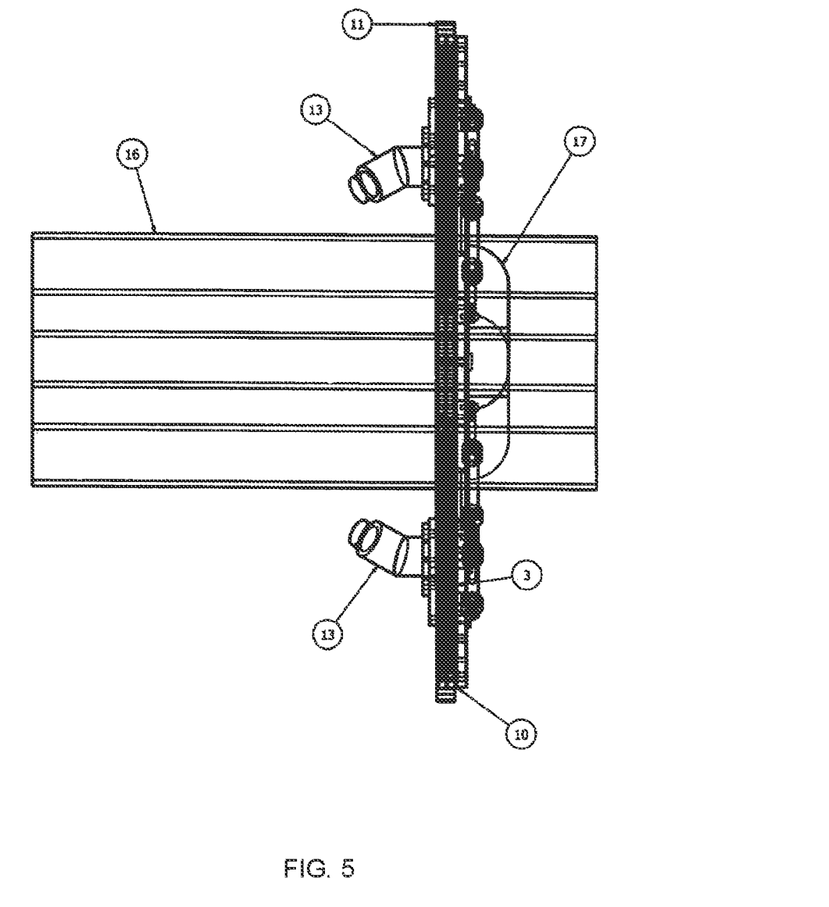
FIG. 5 shows an apparatus according to the invention, from the side.

In FIG. 5 the cutting assembly is shown from the side, where the location of the tubular part 16 inside the assembly is clearly shown. Furthermore the hydraulic motor 13, the measuring means 17 and the radial bearings 10 ensuring that the toothed ring is allowed to rotate in relation to the bearing ring is shown.

The cutting elements 6 may include rolling elements 27 to ensure that the cutting elements 6 may slide in relation to the tubular part 16 that is to be cut to prevent the cutting elements 6 from jamming in the tubular part. This may be common commercially available rolling balls in a bearing liner attached in recesses in the cutting elements.

The carrying body 1 (shown in FIGS. 1 and 2) may include jetting nozzles so 26 at its lower edge to ensure that the carrying body 1 with a cutting assembly may be led at a sufficient distance down into the seabed.

The carrying body 1 may also include means for centring (not shown) and attachment such that the tubular part 16 that is to be cut is centred and is held in place and fixed to the carrying body 1. The cutting portion of the carrying elements will as mentioned typically be covered by synthetic diamonds, but any form of cutting portions, adapted to the material that is to be cut, can be used.

The hydraulic cylinders 12 are shown as an advantageous embodiment, but other actuators that are able to apply a force on the cutting elements towards the tubular parts that is to be cut, may also be used.

Clearly it can also be used a higher or lower number of cutting elements, depending on the need.

Electric, hydraulic or other accumulators may be placed on the part with the cutting elements that rotates to provide energy to the actuators and the measuring means. Alternatively it may be used collector rings, swivels or other means for transferring signals and energy.

Figure 6:
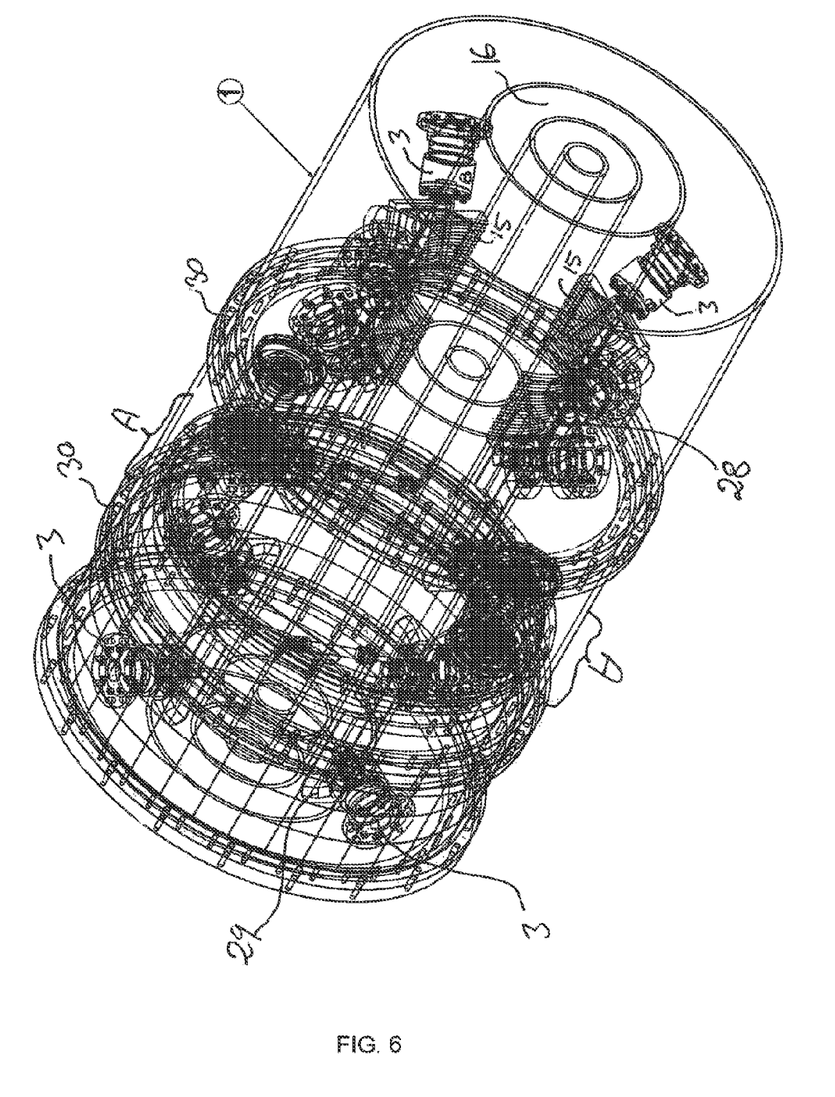
FIG. 6 shows an assembly in a cut through perspective drawing according to a further embodiment of the invention.

In FIG. 6 it is shown an assembly in a cut through perspective view according to a further embodiment of the invention. A cutting apparatus or assembly A as described above is shown combined with elements for attachment and the centring of the carrying body 1 in relation to the tubular part 16. These elements may be useful to ensure attachment and centring of the cutting apparatus A, as this applies a torque and vibrations to the carrying body 1. The elements for attachment and centring are shown with the actuators 3 and the lifting jaws 15, upper centring jaws 28 and lower centring jaws 29. Lifting jaws 15 may apply a tensile stress between these and the lower centring jaws 29 to prevent the cutting elements from jamming. Tensile stress can be applied to the tubular part 16 above the place where the tubular part is to be cut. Therefore it is fixed centring jaws 28, 29 at both sides of the cutting apparatus A. The carrying body 1 may be divided into sections that for instance can be joined with flanges 30 such that the elements for fixing the tubular part 16 and the cutting apparatus A can be placed in separate sections or modules to ease production, maintenance and exchange of parts and elements.

Figure 7:
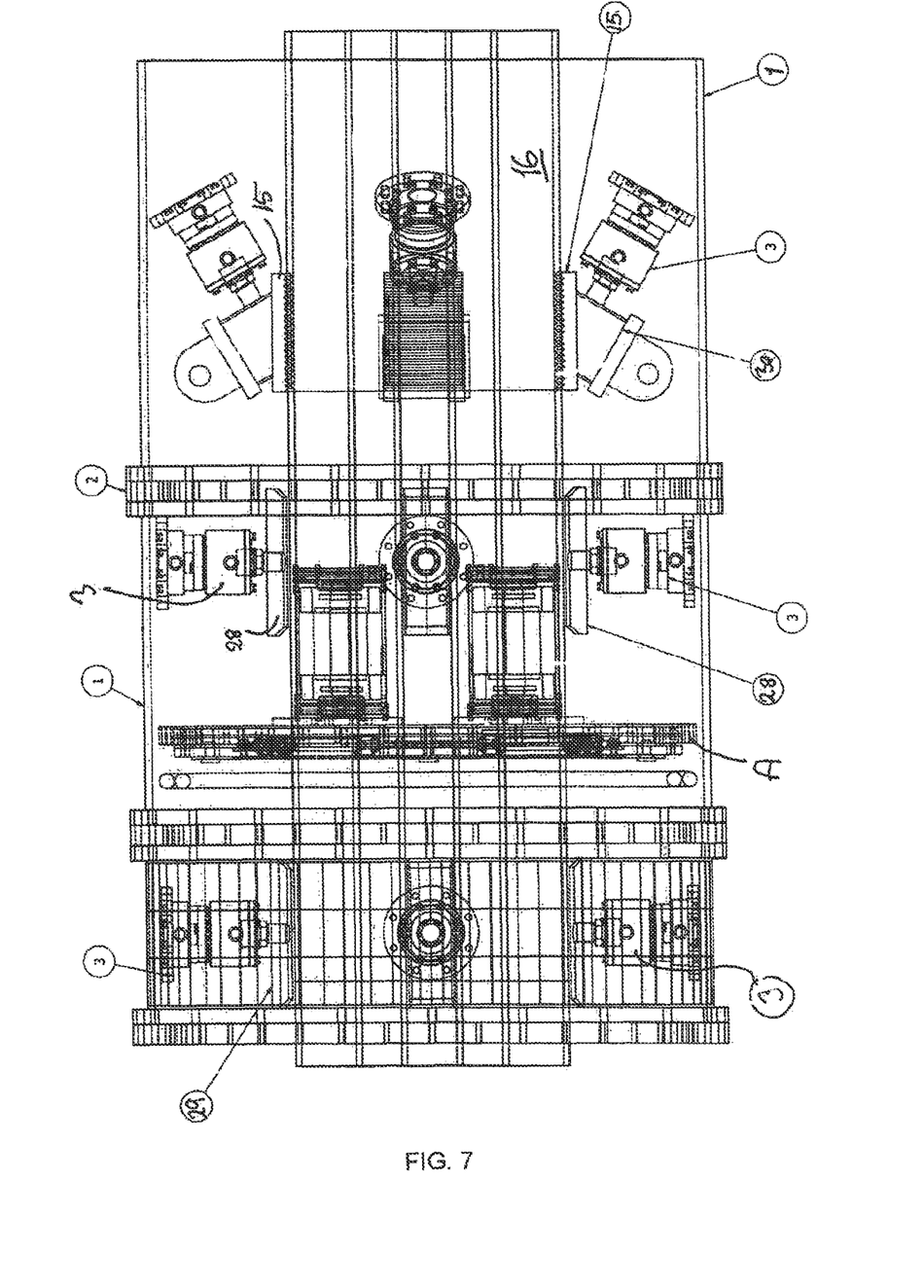
FIG. 7 is a cut through side elevation of the embodiment shown on FIG. 6.

FIG. 7 is a cut through side elevation of the embodiment shown on FIG. 6. The figure shows the lifting jaws 16 actuated by actuators 3. The lifting jaw 15 is shown attached to a movable jaw attachment 30. The jaw attachment may for instance be with a joint as shown. Alternatively, other mechanisms that allows the lifting jaw to be somewhat moved with an axial component may be used. In operation the lifting jaw 15 will grip the tubular part 16 and will be pressed towards the tubular part by means of actuator 3. This will also lead to an application of an axial force along the longitudinal axis of the tubular part and the carrying body. The cutting apparatus A is placed between the upper centring jaws 28 and the lower centring jaws 29. The jaws 28, 29 may be pressed towards the tubular part 16 by the actuators 3. The actuators 3 may be of any suitable type, for instance hydraulic, pneumatic qr electric with a toothed rack, driven screw etc. The jaws may be of a material that provides a good grip about the tubular part and may be of metal and include serrations or rifles that grips into the material of the tubular part. Alternatively they may be equipped with a rubber layer or any other layer that provides good friction against the tubular part 16. The centring jaws may both centre the cutting apparatus A in relation to the tubular part 16 and hold the tubular part in situ in relation to the cutting apparatus A in the carrying body 1. Measuring means may be placed in the carrying body 1 or in any suitable place to ensure that the tubular part 16 is centred. In the figure it is shown both lifting jaws 15 and upper centring jaws 28, but it is possible to contemplate solutions where it only is either centring jaws 28 or lifting jaws 15. In operation may for instance the jaws be driven in a three step sequence, such that the lower centring jaws 29 close to the lower end of the carrying body 1 first grips and centres the tubular part 16 in relation to the lower part of the carrying body 1. Then the lifting jaws 15 may be actuated by the actuators 3 that will turn the pivoted attachment 30 of the fixing jaws 15 such that tension is applied in the tubular part 16 and a corresponding pressure in the carrying body. Finally, the upper centring jaws 28 may be led to clamp against the tube 16, before sawing with the cutting apparatus A begins. This tension in the tubular part 16 prevents the cutting apparatus A from jamming.

Figure 8:
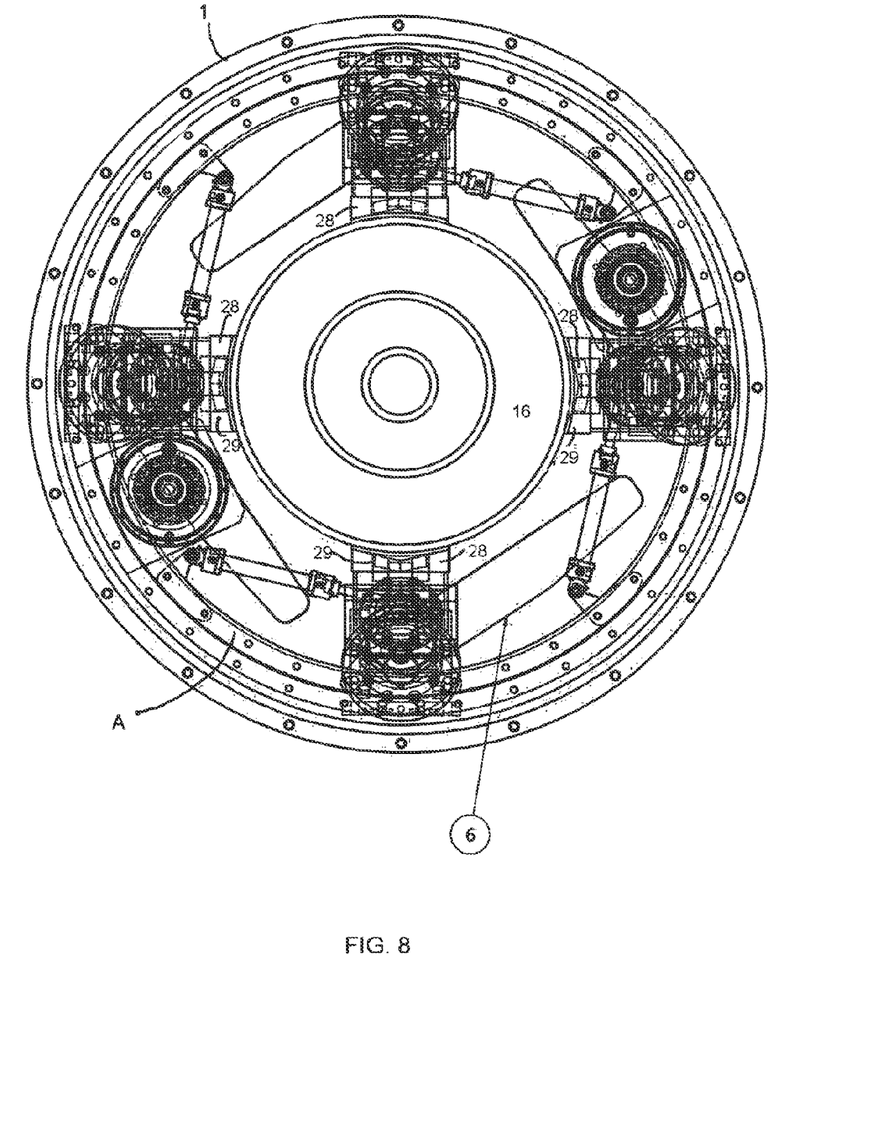
FIG. 8 shows the embodiment of the apparatus according to FIGS. 6 and 7 seen from above.

FIG. 8 shows the embodiment of the apparatus according to FIGS. 6 and 7 seen from above, axially with the carrying body 1 and the tubular part 16. The cutting elements 6 are shown placed in the cutting apparatus A. The jaws 28, 29 are shown in an extended position towards the tubular part 16. A retracted position (not shown) for the jaws is used when the tubular part 16 is to be released, or when the assembly is to be led over the tubular part. It is shown four upper centring jaws 28 and four lower centring jaws 29. The number of jaws can be adapted to various applications and diameters of the tubular part 16.

In one alternative embodiment the holding jaws may be spring loaded against the tubular part, and tension in wires holding the carrying body 1 may contribute to lock the holding jaws towards the tubular part. In this case the actuators 3 are not needed, but this leads to higher requirements for wire tension, which can be problematic in some conditions.

A method for cutting a tubular part with an apparatus according to the invention may include leading the carrying body with the cutting assembly over the tubular part in that the carrying body is lowered from a suitable vessel. Jetting nozzles on the lower part of the carrying body may then flush away the seabed around the tubular part such that the carrying body can be led in a desired distance down over the tubular part. In some cases the weight of the carrying body is sufficient such that the assembly will move downwards at a sufficient distance into the bottom, whereas in other seabed conditions it will be necessary to jet down the carrying body. When the carrying body has a desired location over the tubular part, the tubular part may be centred in relation to the carrying body, such that tubular part substantially is at the centre of the carrying body. The hydraulic motors may then be started such that the pinions rotate the toothed ring, and thereby rotate the cutting elements in relation to the tubular part. Pressure may then be applied to the hydraulic cylinders for pressing the cutting elements toward the tubular part with a predetermined force. This is performed until the tubular part is cut, and the tubular part can then be elevated to the surface as the tubular part that has been cut off is attached in the carrying body and the carrying body may be elevated and taken on board on the vessel. This finalizes the operation.

As previously mentioned, may for instance two cutting elements be used, and two cutting elements may be parked in a retracted position. Should the cutting elements that are in operation fail, may these be retracted, and the cutting elements that had been placed in the retracted position can be led into the cutting area and can complete the cutting.

Alternatively, all the cutting units may be cut at the same time.

The invention claimed is:

1. An apparatus for cutting a tubular part extending down into a sea or ocean bed, below the seabed, wherein the apparatus includes:

a carrying body with a cutting assembly placed in the carrying body, wherein said cutting assembly includes a continuous ring adapted to be driven in rotation in the carrying body and the carrying body is configured to receive a tubular part where an end of the tubular part is inserted into the carrying body;

at least one pivotally attached cutting element with a cutting edge, hinged to the continuous ring at a first joint;

at least one actuator coupled at a second joint in the cutting element, and for pivoting the cutting element about the first joint between a retracted position and a cutting position towards the tubular part that is to be cut;

at least one sensor configured to measure a position of each cutting element and a force applied to each cutting element;

at least one jaw or wedge for holding and centering the tubular part in relation to the cutting assembly; and at least one actuator connected to the body and the at least one jaw for pressing the jaw or wedge against the tubular part.

2. The apparatus according to claim 1, wherein the carrying body includes jetting nozzles for jetting the carrying body with the cutting assembly down into the seabed for cutting the tubular part at a level below the seabed.

3. The apparatus according to claim 1, wherein the cutting assembly furthermore includes at least two cutting elements with corresponding actuators placed on the continuous ring, at a distance of 180 degrees apart.

4. The apparatus according to claim 1, further including at least four cutting elements with respective actuators placed on the continuous ring at a distance of 90 degrees from each other.

5. The apparatus according to claim 1, wherein the continuous ring comprises a toothed ring, and wherein at least one motor, placed on the carrying body, includes a gear meshing with the toothed ring for driving the toothed ring in relation to the carrying body.

6. The apparatus according to claim 1, further including an inner housing placed in the carrying body for protecting the cutting assembly, wherein the inner housing includes an opening for the tubular part extending there through, and a gap for the at least one cutting element, such that the at least one cutting element may adopt a first position inside the inner housing and a second position extending through the gap.

7. The apparatus according to claim 6, further includes a flexible protecting structure covering the gap to protect the cutting assembly from foreign bodies and debris.

8. The apparatus according to claim 1, wherein the actuator is a hydraulic cylinder.

9. The apparatus according to claim 1, wherein the cutting portion of the cutting element includes synthetic diamonds.

10. The apparatus according to claim 1, wherein the cutting element includes rolling elements on a face towards a cutting face of an item to be cut to prevent jamming of the cutting element in the tubular element that is to be cut.

11. The apparatus according to claim 1, further including at least one set of jaws with appurtenant actuators, at each side of the cutting apparatus.

12. The apparatus according to claim 1, further including at least one set of lifting jaws attached with a movable jaw attachment allowing a motion with an axial component for applying a tensile stress in the tubular part.

13. The apparatus according to claim 1, including at least two jaws, where each jaw is connected to an actuator and where each actuator can be controlled individually, based on signals from the sensor that measure the location of the tubular part in relation to the carrying body.

14. A method for cutting a tubular part with an apparatus according claim 1, comprising:

leading the carrying body with the cutting assembly over the tubular part in that the carrying body is lowered from a suitable vessel;

flush away the seabed around the tubular part such that the carrying body can be led a desired distance down over the tubular part with jetting nozzles on the lower part of the carrying body;

centering the tubular part in relation to the carrying body by actuating at least one jaw or wedge connected to the carrying body, such that tubular part substantially is at the centre of the carrying body when the carrying body has a desired location over the tubular part;

starting a hydraulic motor with a pinion in contact with a toothed portion on the ring, thereby rotating the cutting elements in relation to the tubular part;

applying pressure to hydraulic cylinders for pressing the at least one cutting element towards the tubular part with a predetermined force until the tubular part is cut; and elevating the tubular part to the surface as the tubular part that has been cut off is attached in the carrying body and the carrying body is elevated and taken on board the vessel.

15. A method for cutting a tubular part extending down into a sea or ocean bed, below the seabed, including lowering a carrying body with a cutting assembly from a vessel and inserting an end of the tubular part that is to be cut into the carrying body, such that the cutting assembly is located where the cut is to be performed;

centering the tubular part in relation to the cutting assembly by actuating at least one jaw or wedge connected to the carrying body;

driving a continuous ring with at least one cutting element on the cutting assembly in rotation by at least one motor, the at least one cutting element being hinged to the continuous ring in a first joint and including a cutting edge;

leading the at least one cutting element towards the tubular part with actuators at least one actuator attached in a second joint in the cutting element such that a force is applied to the at least one cutting element against the tubular part, such that this the tubular member is cut;

measuring a position of at least one cutting element;

measuring a force that is applied to the at least one cutting element; and retrieving the carrying body with a cutting element and the cut off tubular part to the vessel.

16. The method according to claim 15, further including jetting the carrying body with the cutting assembly down to a level below the seabed with jetting nozzles on the carrying body.

* * * * *